United States Patent
Baron Von Ceumern-Lindenstjerna et al.

(10) Patent No.: US 11,261,771 B2
(45) Date of Patent: Mar. 1, 2022

(54) METHOD FOR HEATING A CATALYTIC CONVERTER AND EXHAUST GAS AFTERTREATMENT SYSTEM

(71) Applicant: VOLKSWAGEN AKTIENGESELLSCHAFT, Wolfsburg (DE)

(72) Inventors: Falk-Christian Baron Von Ceumern-Lindenstjerna, Braunschweig (DE); Stefan Paukner, Wolfsburg (DE); Michael Kaack, Rötgesbüttel (DE)

(73) Assignee: VOLKSWAGEN AKTIENGESELLSCHAFT

( * ) Notice: Subject to any disclaimer, the term of this patent is extended or adjusted under 35 U.S.C. 154(b) by 0 days.

(21) Appl. No.: 16/987,824

(22) Filed: Aug. 7, 2020

(65) Prior Publication Data
US 2021/0040873 A1    Feb. 11, 2021

(30) Foreign Application Priority Data

Aug. 8, 2019    (DE) .................... 10 2019 121 428.9

(51) Int. Cl.
*F01N 3/10* (2006.01)
*F01N 3/20* (2006.01)
(Continued)

(52) U.S. Cl.
CPC .......... *F01N 3/2033* (2013.01); *F01N 3/101* (2013.01); *F02D 41/0255* (2013.01); *F02D 41/064* (2013.01); *F02D 41/1454* (2013.01)

(58) Field of Classification Search
CPC ........ F01N 3/2033; F01N 3/101; F01N 3/025; F01N 3/035; F01N 9/00; F01N 11/00;
(Continued)

(56) References Cited

U.S. PATENT DOCUMENTS

2012/0315192 A1* 12/2012 Tsujimoto .............. F02B 37/24
                                                              422/109
2013/0327023 A1* 12/2013 Schluter .................... F01N 3/08
                                                               60/274
(Continued)

FOREIGN PATENT DOCUMENTS

CN          3115566 A1    1/2017
CN         106988843 A    7/2017
(Continued)

OTHER PUBLICATIONS

Search report for German Patent Application No. 10 2019 121 428.9, dated Jun. 29, 2020.
(Continued)

*Primary Examiner* — Audrey B. Walter
*Assistant Examiner* — Dapinder Singh
(74) *Attorney, Agent, or Firm* — Pearl Cohen Zedek Latzer Baratz LLP

(57) ABSTRACT

A method for heating a catalytic converter in an exhaust system of an internal combustion engine, in which an exhaust gas burner for heating the catalytic converter is arranged, upstream of the catalytic converter. A lambda probe for controlling the combustion air ratio of the exhaust gas burner is arranged immediately downstream of the exhaust gas burner and upstream of the catalytic converter. The method includes operating the internal combustion engine with a stoichiometric combustion air ratio ($\lambda_E=1$), activating the exhaust gas burner, which is operated alternately with a substoichiometric combustion air ratio ($\lambda_B<1$) and a superstoichiometric combustion air ratio ($\lambda_B>1$), wherein from the substoichiometric combustion air ratio ($\lambda_B<1$) to the superstoichiometric combustion air ratio ($\lambda_B>1$) as soon as a rich breakthrough is detected by the second lambda probe (34), and wherein a switchover from the superstoichiometric combustion air ratio ($\lambda_B>1$) to the (Continued)

substoichiometric combustion air ratio ($\lambda_B < 1$) takes place as soon as a lean breakthrough is detected by the second lambda probe.

14 Claims, 3 Drawing Sheets

(51) Int. Cl.
    *F02D 41/02*            (2006.01)
    *F02D 41/06*            (2006.01)
    *F02D 41/14*            (2006.01)

(58) Field of Classification Search
    CPC ............... F01N 11/007; F01N 2240/14; F01N 2430/06; F01N 2560/025; F01N 2560/14; F02D 41/0255; F02D 41/064; F02D 41/1454

See application file for complete search history.

(56) References Cited

U.S. PATENT DOCUMENTS

| | | | |
|---|---|---|---|
| 2016/0222898 A1* | 8/2016 | Ulrey | ................ F01N 9/002 |
| 2019/0211725 A1 | 7/2019 | Paukner et al. | |
| 2020/0116061 A1 | 4/2020 | Hupfeld et al. | |
| 2020/0157995 A1 | 5/2020 | Paukner et al. | |

FOREIGN PATENT DOCUMENTS

| | | |
|---|---|---|
| CN | 108691612 A | 10/2018 |
| CN | 110017194 A | 7/2019 |
| DE | 195 08 013 C1 | 3/1996 |
| DE | 19508013 C1 | 3/1996 |
| DE | 10 2008 032 601 A1 | 1/2010 |
| DE | 10 2008 032601 A1 | 1/2010 |
| DE | 10 2012 021 573 A1 | 5/2014 |
| DE | 10 2012 021573 A1 | 5/2014 |
| DE | 10 2014 000871 B3 | 4/2015 |
| DE | 10 2017 113 366 A1 | 12/2018 |
| DE | 10 2017 113366 A1 | 12/2018 |
| DE | 10 2017 118 215 A1 | 2/2019 |
| DE | 10 2017 118215 A1 | 2/2019 |
| DE | 10 2018 100 240 A1 | 7/2019 |
| JP | 2005256797 A | 9/2005 |
| WO | WO 1996/027733 A1 | 9/1996 |
| WO | WO 2019/030315 A1 | 2/2019 |

OTHER PUBLICATIONS

Search report for European Patent Application No. 20189326.0, dated Sep. 18, 2020.
Office Action for Chinese Patent Application No. 202010782731.1 dated Dec. 3, 2021.

* cited by examiner

METHOD FOR HEATING A CATALYTIC CONVERTER AND EXHAUST GAS AFTERTREATMENT SYSTEM

CROSS-REFERENCE TO RELATED APPLICATIONS

This application claims priority from German Patent Application No. 10 2019 121 428.9, filed Aug. 8, 2019, which is incorporated herein by reference in its entirety.

FIELD OF THE INVENTION

The invention relates to a method for heating a catalytic converter in an exhaust gas aftertreatment system and an exhaust gas aftertreatment system with a catalytic converter according to the preamble of the independent claims.

BACKGROUND OF THE INVENTION

The continual tightening of exhaust gas legislation places high demands on vehicle manufacturers, which can be solved by taking appropriate measures to reduce raw engine emissions and by appropriate exhaust gas aftertreatment. In order to be able to effectively convert the raw emissions, which are not completely avoidable, downstream of the engine, catalytic converters coated with precious metal are installed in the exhaust system of the internal combustion engine. In order for these catalytic converters to be able to convert the pollutants, a minimum temperature level of the exhaust gas and the catalytic converter is necessary. In order to bring the catalytic converter up to operating temperature as quickly as possible after a cold start of the internal combustion engine, engine heating measures are used, such as an adjustment of the ignition angle or the fuel injection in the "late" direction or a substoichiometric operation of the internal combustion engine with simultaneous introduction of secondary air. In order to introduce even more thermal energy into the exhaust system, it is possible to heat the catalytic converter electrically or to install a switchable exhaust gas burner on the exhaust system in order to introduce hot exhaust gas into the exhaust system and to heat the exhaust gas aftertreatment components arranged in the exhaust system independently of the internal combustion engine. As a result, the emissions can already be significantly reduced in the heating phase of the catalytic converter.

In an underbody position of a motor vehicle, there is usually a relatively large amount of installation space available, so that large-volume catalytic converters can be arranged in this position, which can provide a high catalytically effective volume when the exhaust system is heated. A disadvantage of the arrangement of a catalytic converter in the underbody position, however, is that, due to the long exhaust gas run length between the outlet of the internal combustion engine and the heat losses through the walls of the exhaust gas duct, a comparatively long time passes until a catalytic converter in the underbody position has reached its light-off temperature.

A particularly effective measure for heating a catalytic converter, in particular a catalytic converter in the underbody position of a motor vehicle, is an exhaust gas burner, since high heat outputs can be represented with such an exhaust gas burner. Measures to control or regulate the exhaust gas burner are necessary so that such an exhaust gas burner can be operated optimally in terms of emissions and can also meet the requirements for on-board diagnosis.

From DE 195 08 013 C1 an exhaust system for an internal combustion engine with a three-way catalytic converter and an exhaust gas burner is known, wherein a lambda probe is arranged downstream of an outlet of the internal combustion engine and upstream of the inlet point of the exhaust gas burner in order to regulate the combustion air ratio of the internal combustion engine.

An exhaust gas aftertreatment system for a spark-ignition internal combustion engine is known from DE 10 2017 113 366 A1. The internal combustion engine is connected on the outlet side to an exhaust system, wherein an electrically heatable three-way catalytic converter in the exhaust system is arranged in the flow direction of an exhaust gas through the exhaust system, a four-way catalytic converter is arranged downstream of the electrically heatable three-way catalytic converter and a further three-way catalytic converter is arranged downstream of the four-way catalytic converter. Before the internal combustion engine is started, the electrically heatable three-way catalytic converter and preferably also the four-way catalytic converter are heated in order to enable efficient exhaust gas aftertreatment of the raw emissions of the internal combustion engine from the start of the internal combustion engine. The exhaust gas aftertreatment system is also set up to enable efficient conversion of the pollutants even during regeneration of the four-way catalytic converter and thus to ensure particularly low emissions in all operating states of the motor vehicle.

DE 10 2017 118 215 A1 discloses an exhaust gas aftertreatment system for an internal combustion engine, in particular for an internal combustion engine which is charged by means of an exhaust gas turbocharger and is spark-ignited by spark plugs. In this case, a particulate filter is arranged in an exhaust system connected to an outlet of the internal combustion engine in a position close to the engine and a first three-way catalytic converter is arranged downstream of the particulate filter. In the underbody position of the motor vehicle, a further three-way catalytic converter is arranged downstream of the first three-way catalytic converter. It is provided that an exhaust gas burner is active from an engine start, and said exhaust gas burner introduces hot exhaust gas downstream of the particle filter into the exhaust system in order to heat up at least one of the three-way catalytic converters to a light-off temperature as quickly as possible after the cold start and thus to enable efficient exhaust gas aftertreatment.

However, a disadvantage of the exhaust gas aftertreatment system known from the prior art is that the combustion air ratio of the exhaust gas burner is pilot-controlled and the raw emissions of the exhaust gas burner can therefore be comparatively high.

The object of the invention is now to minimize the exhaust gas emissions of an exhaust gas burner during the heating phase of the catalytic converter and to enable the catalytic converter to be heated up as quickly as possible and with the least possible emissions.

SUMMARY OF THE INVENTION

According to the invention, this object is achieved by a method for heating a catalytic converter in an exhaust system of an internal combustion engine. An exhaust gas burner for heating the catalytic converter is arranged in the exhaust system upstream of the catalytic converter. A first lambda probe for controlling the combustion air ratio of the internal combustion engine is arranged downstream of an outlet of the internal combustion engine and upstream of the exhaust gas burner. A second lambda probe for controlling the combustion air ratio of the exhaust gas burner is arranged immediately downstream of the exhaust gas burner and upstream of the catalytic converter. The method includes the following steps:

operating the internal combustion engine with a stoichiometric combustion air ratio, activating the exhaust gas burner, wherein the exhaust gas burner is operated alternately with a substoichiometric combustion air ratio ($\lambda_B<1$) and a superstoichiometric combustion air ratio ($\lambda_B>1$), wherein from the substoichiometric combustion air ratio ($\lambda_B<1$) to the superstoichiometric combustion air ratio ($\lambda_B>1$) as soon as a rich breakthrough is detected by the second lambda probe, and wherein a switchover from the superstoichiometric combustion air ratio ($\lambda_B>1$) to the substoichiometric combustion air ratio ($\lambda_B<1$) takes place as soon as a lean breathrough is detected by the second lambda sensor.

The method according to the invention makes it possible to regulate the exhaust gas burner, which enables the catalytic converter to be heated up quickly and, in addition to the direct heat input through the exhaust gas burner, enables the catalytic converter to be catalytically heated, as a result of which the catalytic converter can be heated up particularly quickly. In this context, an arrangement of the lambda probe directly downstream of the exhaust gas burner is understood to mean that no catalytically active component, in particular no exhaust gas aftertreatment component with an oxygen storage capacity, is arranged between the inlet point of the exhaust gas burner into the exhaust gas duct and the lambda probe. This results in a particularly fast control behavior since dead time elements are avoided.

The features listed in the dependent claims enable advantageous improvements and non-trivial further developments of the method for heating a catalytic converter in an exhaust system of an internal combustion engine specified in the independent claim.

In a preferred embodiment of the invention it is provided that a third lambda probe is arranged downstream of the catalytic converter, wherein a stoichiometric exhaust gas is set downstream of the catalytic converter. This can prevent emission breakthroughs by the catalytic converter due to substoichiometric or superstoichiometric operation of the exhaust gas burner, as a result of which low tailpipe emissions can be ensured in the heating phase.

Alternatively or additionally, it is advantageously provided that the combustion air ratio of the exhaust gas burner is adjusted by adapting the quantity of fuel of the exhaust gas burner or by adapting the quantity of fuel and the quantity of air. The control speed can be increased by adjusting the quantity of fuel. A particularly quick change between a substoichiometric combustion air ratio and a superstoichiometric combustion air ratio is thus possible.

In a preferred embodiment of the method it is provided that the combustion air ratio of the exhaust gas burner is adjusted by adapting the quantity of air of the exhaust gas burner. Simple pilot control and regulation of the combustion air ratio of the exhaust gas burner is possible by adaptation of the quantity of air with a constant quantity of fuel.

In an advantageous embodiment of the method it is provided that the superstoichiometric combustion air ratio is set in the range $1.02<\lambda_B<1.1$. A slightly superstoichiometric combustion air ratio can ensure that there are no oxygen breakthroughs through the catalytic converter during the superstoichiometric operation of the exhaust gas burner. The difference between the superstoichiometric combustion air ratio and the stoichiometric combustion air ratio is selected to be so great that the superstoichiometric combustion air ratio is recognized by a jump probe.

In a further advantageous embodiment of the method, it is provided that the substoichiometric combustion air ratio is set in the range $0.9<\lambda_B<0.98$. A slightly sub-stoichiometric combustion air ratio can ensure that the exhaust burner has only low soot emissions. Furthermore, it can be ensured that the unburned fuel can be reacted exothermically with the oxygen stored in the catalytic converter. Catalytic heating of the catalytic converter can thus be initiated. The slightly substoichiometric combustion air ratio also prevents breakthroughs of unburned hydrocarbons, so that tailpipe emissions during the heating phase can be minimized. The difference between the substoichiometric combustion air ratio and the stoichiometric combustion air ratio is selected to be so large that the substoichiometric combustion air ratio is detected by a jump probe.

In a further preferred embodiment of the invention it is provided that the amplitude of the alternating change between the substoichiometric combustion air ratio and the superstoichiometric combustion air ratio is greater than one hertz. Fast switching at a frequency of more than one hertz, i.e. at least one switchover operation per second between the substoichiometric combustion air ratio of the exhaust gas burner and the superstoichiometric combustion air ratio, can ensure that the oxygen store of the catalytic converter has sufficient oxygen to exothermically convert the unburned hydrocarbons.

It is particularly preferred if the method for heating a catalytic converter is initiated immediately after a cold start of the internal combustion engine. Immediately after a cold start, a high heat output is required in order to heat the catalytic converter to its light-off temperature as quickly as possible in order to enable the limited exhaust gas components to be converted into unlimited exhaust gas components.

According to the invention, an exhaust gas aftertreatment system for an internal combustion engine with at least one combustion chamber is proposed, wherein the exhaust gas aftertreatment system comprises an exhaust system in which an exhaust gas burner for heating a catalytic converter is arranged in the flow direction of an exhaust gas of the internal combustion engine and a catalytic converter is arranged downstream of the exhaust gas burner. A first lambda probe, by which a combustion air ratio of the exhaust gas burner can be regulated, is arranged directly downstream of the exhaust gas burner. The exhaust gas aftertreatment system further comprises a control device which is set up to carry out a method according to the invention when a machine-readable program code is executed by the control device. Such an exhaust gas aftertreatment system enables the catalytic converter to be heated up quickly, in particular after a cold start of the internal combustion engine. The lambda probe enables the combustion air ratio of the exhaust gas burner to be controlled quickly and precisely, since there are no dead time elements between the inlet point for the hot gases of the exhaust gas burner and the lambda probe.

In a preferred embodiment of the exhaust gas aftertreatment system, it is provided that the catalytic converter is designed as a three-way catalytic converter. In particular in the case of a three-way catalytic converter, heating can be accelerated by a method according to the invention, since the exhaust gas burner has low raw emissions in this area and catalytic heating additionally takes place when the light-off temperature is reached. In this way, a temperature range of the three-way catalytic converter which is optimal in terms of emissions can be reached quickly.

Alternatively, it is advantageously provided that the catalytic converter is designed as a four-way catalytic converter. In this context, a four-way catalytic converter is to be understood as a particulate filter with a three-way catalytically active coating. In addition to heating in the cold start phase, regeneration of the four-way catalytic converter can also be supported by the exhaust gas burner since, in particular in an underbody position of a motor vehicle, it is not possible in all operating states with engine heating measures for temperatures to be reached at which a rapid and efficient oxidation of the soot retained in the four-way catalytic converter is possible.

In a preferred embodiment of the invention it is provided that the catalytic converter is arranged in an underbody position of a motor vehicle. Since a catalytic converter in the underfloor position requires a longer time to be heated to its light-off temperature due to the longer exhaust gas path and the heat losses via the walls of the exhaust gas duct, it is particularly advantageous to heat such a catalytic converter in the underbody position by means of an exhaust gas burner in order to enable an efficient conversion of the pollutants contained in the exhaust gas flow as soon as possible after a cold start of the internal combustion engine by means of such a catalytic converter in the underbody position, in particular when the use of an exhaust gas burner with a catalytic converter close to the engine is not possible due to the installation space, the lambda control or inadequate mixing distances.

According to a further preferred embodiment of the invention, it is provided that the catalytic converter is arranged in a position close to the engine, in particular as a first emission-reducing exhaust gas aftertreatment component in the flow direction of an exhaust gas of the internal combustion engine through the exhaust system. In this context, a position close to the engine means a position with an exhaust gas run length of less than 80 cm, preferably less than 50 cm, from an outlet of the internal combustion engine. In particular, the catalytic converter is arranged directly downstream of a turbine of an exhaust gas turbocharger as the first emission-reducing exhaust gas aftertreatment component. The heat losses of the exhaust gas of the internal combustion engine to the catalytic converter can thus be reduced, as a result of which the exhaust system upstream of the catalytic converter can be heated up in a comparatively short time. The exhaust gas flow from the internal combustion engine can then keep the catalytic converter at a temperature above the light-off temperature, so that after the initial heating by the exhaust gas burner, no further heating operations are necessary or these heating operations can be shortened.

Alternatively, it is advantageously provided that the catalytic converter is arranged in a position remote from the engine, in particular in an underbody position of a motor vehicle. Using the method according to the invention, even large-volume catalytic converters in an underbody position of a motor vehicle can be heated up to their light-off temperature immediately after a cold start of the internal combustion engine. The thermal load at this position of the exhaust system is lower during high-load operation or full-load operation of the internal combustion engine, so that the catalytically active surface is exposed to lower peak temperatures and therefore ages more slowly than in a position close to the engine.

In an advantageous embodiment of the exhaust gas aftertreatment system, it is provided that the second lambda probe is designed as a jump probe. A jump probe is to be understood as a lambda probe, the voltage of which is subject to a sudden change in the range of a stoichiometric combustion air ratio ($\lambda=1$). In this way, a substoichiometric exhaust gas can be easily and inexpensively distinguished from a superstoichiometric exhaust gas.

Alternatively, it is advantageously provided that the second lambda probe is designed as a broadband probe. Although a broadband probe is more expensive than a jump probe, it also has sufficient measurement accuracy in the range of $0.98<\lambda<1.02$, so that the substoichiometric combustion air ratio and the superstoichiometric combustion air ratio can be selected closer to a stoichiometric combustion air ratio.

According to an advantageous embodiment of the exhaust gas aftertreatment system, it is provided that a further catalytic converter is arranged downstream of the catalytic converter, wherein a second lambda sensor is arranged downstream of the catalytic converter and upstream of the further catalytic converter, wherein the further lambda sensor is set up to regulate the combustion air ratio of the internal combustion engine. This can ensure that there is no rich or lean breakthrough through the catalytic converter during the alternating change between the substoichiometric combustion air ratio and the superstoichiometric combustion air ratio of the exhaust gas burner.

Unless otherwise stated in the individual case, the various embodiments of the invention mentioned in this application can advantageously be combined with one another.

BRIEF DESCRIPTION OF THE DRAWINGS

The invention is explained below in exemplary embodiments with reference to the accompanying drawings. The same components or components having the same function are identified in the different figures with the same reference numerals. In the drawings.

DETAILED DESCRIPTION OF THE INVENTION

Figure 1:
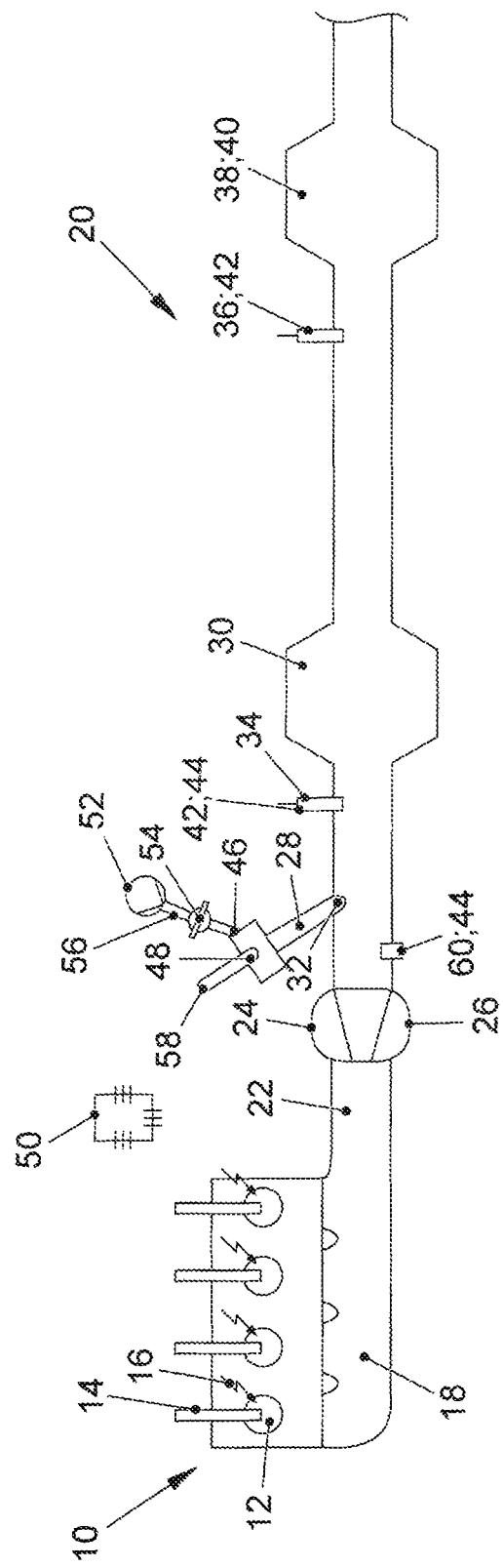
FIG. 1 shows a preferred exemplary embodiment of an internal combustion engine with an exhaust gas aftertreatment system.

FIG. 1 shows a schematic illustration of an internal combustion engine 10, the outlet 18 of which is connected to an exhaust system 20 of an exhaust gas aftertreatment system according to the invention for exhaust gas aftertreatment of an exhaust gas stream from the internal combustion engine 10. The internal combustion engine 10 is designed as a gasoline engine, which is spark-ignited by means of external ignition means, in particular by means of spark plugs 16. The internal combustion engine 10 has a plurality of combustion chambers 12, in which a fuel-air mixture is burned. For this purpose, a fuel injector 14 is provided in each case at the combustion chambers 12 in order to inject a fuel into the combustion chambers 12. The internal combustion engine 10 is preferably designed as an internal combustion engine 10 charged by means of an exhaust gas turbocharger 24, wherein a turbine 26 of the exhaust gas turbocharger 24 is arranged downstream of the outlet 18 and upstream of a three-way catalytic converter 30 close to the engine. The exhaust system 20 comprises an exhaust gas duct 22, in which a second catalytic converter 38, 40 is arranged in the direction of flow of an exhaust gas through the exhaust gas duct 22 downstream of the three-way catalytic converter 30 close to the engine in an underbody position of a motor vehicle. The second catalytic converter 38, 40 is preferably designed as a four-way catalytic converter 40 and combines a three-way catalytic function with a particulate reduction function. Alternatively, the second catalytic converter 38, 40 can also be designed as a further three-way catalytic converter 38.

Downstream of the turbine 26 of the exhaust gas turbocharger 24 and upstream of the three-way catalytic converter 30 close to the engine, an inlet point 32 for an exhaust gas burner 28 is provided, at which a hot burner exhaust gas of the exhaust gas burner 28 for heating the three-way catalytic converter 30 can be introduced into the exhaust gas duct 22. A first lambda probe 60 for controlling the combustion air ratio of the internal combustion engine 10 is arranged downstream of the outlet 18 of the internal combustion engine and upstream of the inlet point 32, in particular downstream of the turbine 26 of the exhaust gas turbocharger 24 and upstream of the inlet point 32. The first lambda probe 60 is preferably designed as a broadband probe 44. A second lambda probe 34, in particular a jump probe 42, is arranged downstream of the inlet point 32 and upstream of the three-way catalytic converter 30 in order to regulate the combustion air ratio $\lambda_B$ of the exhaust gas burner 28. A third lambda probe 36, which can be designed as a jump probe 42 or as a broadband probe 44, is arranged downstream of the three-way catalytic converter 30 and upstream of the second catalytic converter 38, 40. Alternatively, the second lambda probe 34 can also be designed as a broadband probe 44.

The exhaust gas burner 28 has a secondary air supply 46 and a fuel supply 48, via which the combustion air ratio $\lambda_B$ of the exhaust gas burner 28 can be set. The secondary air supply 46 preferably comprises a secondary air pump 52 and a secondary air valve 54, wherein the secondary air valve 54 is arranged in a secondary air line 56 which connects the secondary air pump 52 to the exhaust gas burner 28. The fuel supply 48 comprises in particular a fuel injector 58 which is connected to a fuel supply system which supplies the fuel injectors 14 of the internal combustion engine 10 with fuel. The three-way catalytic converter 30 close to the engine can thus be heated up with the exhaust gas burner 28.

The internal combustion engine 10 and the exhaust gas burner 28 are connected to a control unit 50, which controls the fuel injection through the fuel injectors 14, 58 at the combustion chambers 12 of the internal combustion engine 10 and at the combustion chamber of the exhaust gas burner 28.

According to the invention, a method is proposed which is designed to heat up a three-way catalytic converter 30, 38 or a four-way catalytic converter 40 of a gasoline engine as quickly as possible to the light-off temperature required for a high conversion rate. During this active heating phase, the lambda control is carried out in such a way that the gaseous emissions are as low as possible until the light-off temperature is reached. Such a method is shown in FIG. 3.

Figure 3:
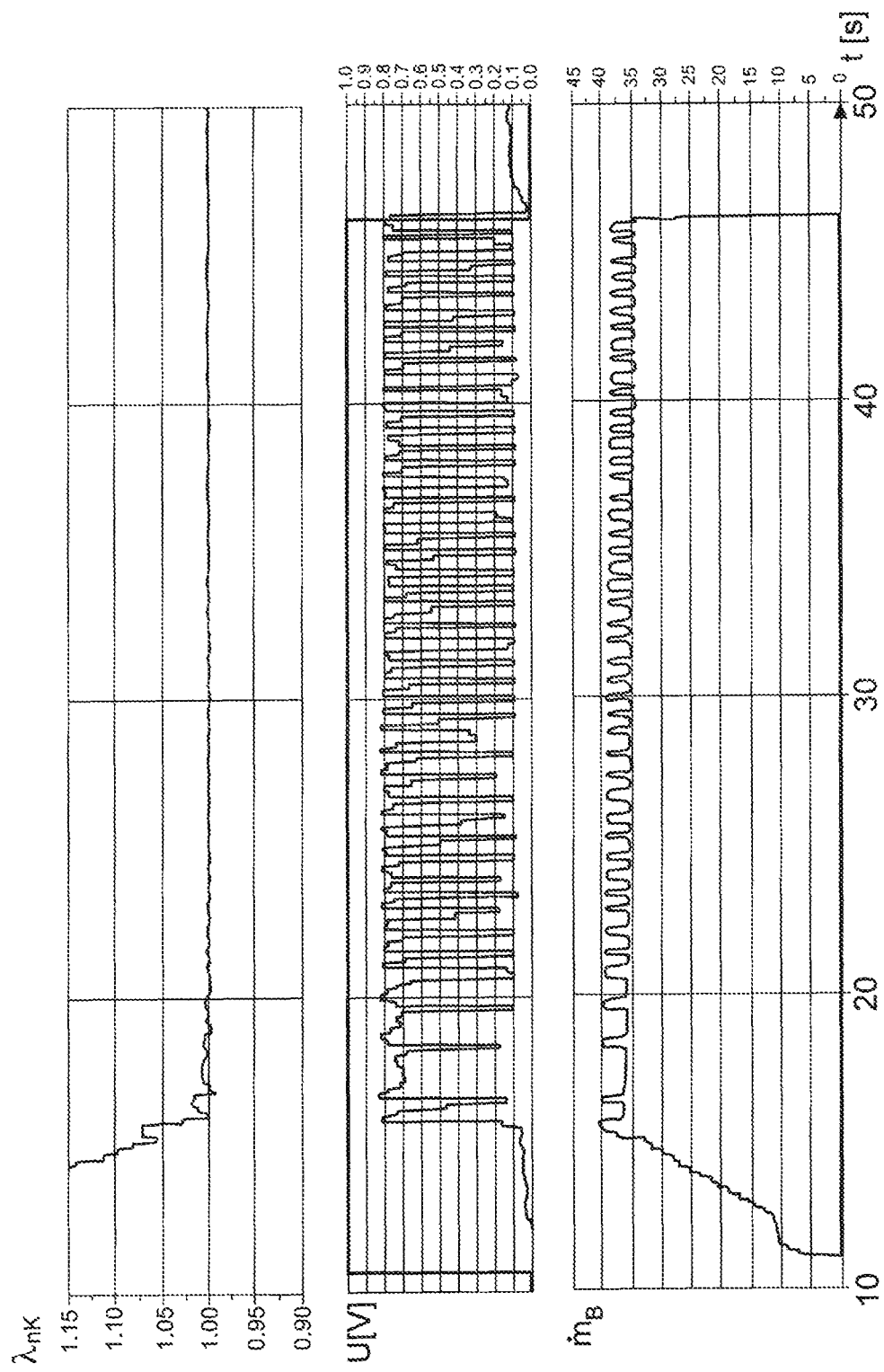
FIG. 3 shows time profiles of various parameters during the implementation of a method according to the invention for heating a catalytic converter in the exhaust system of an internal combustion engine.
Figure 4:
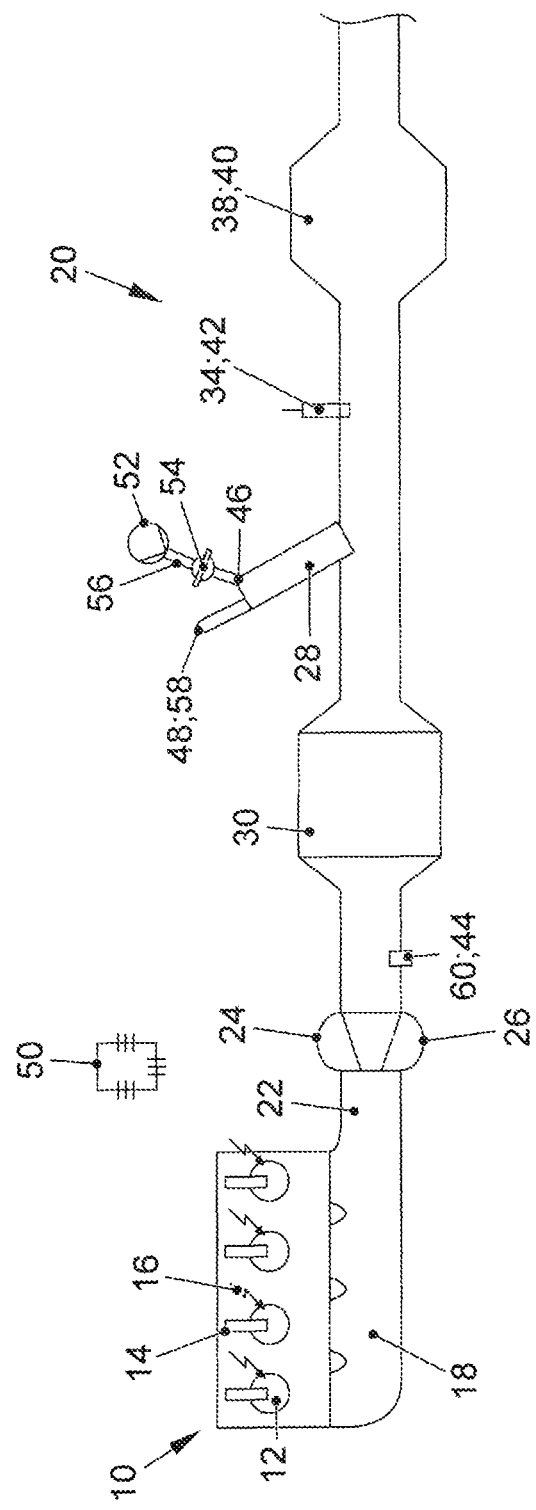
FIG. 4 shows a further exemplary embodiment of an internal combustion engine with an exhaust gas aftertreatment system for carrying out a method according to the invention for heating a catalytic converter.

The time profile of the exhaust gas air ratio $\lambda_{nK}$ downstream of the three-way catalytic converter 30, the time profile of the electrical voltage U at the jump probe 42, and the fuel mass flow $\dot{m}$ of the exhaust gas burner 28 during implementation of a method according to the invention for heating the catalytic converter 30, are shown in FIG. 3. Based on the exemplary embodiment according to FIG. 4, FIG. 3 shows the time profile of the exhaust gas air ratio $\lambda_{nK}$ downstream of the further catalytic converter 38, 40.

In order to represent the lowest possible gaseous emissions in the active heating phase of the catalytic converter 30, 38, 40, it is necessary to regulate the mixed lambda from the combustion air ratio $\lambda_E$ of the internal combustion engine 10 and the combustion air ratio of the exhaust gas burner 28 to a stoichiometric ratio. A jump probe 42 is preferably used for this purpose. The combustion air ratio $\lambda_E$ of the internal combustion engine 10 is controlled to a stoichiometric combustion air ratio. The exhaust gas burner 28 is subjected to a forced amplitude in a pilot-controlled manner. The manipulated variable is preferably the fuel. This is carried out, for example, with an increase/decrease in a stoichiometric combustion air ratio of +/−5%. As soon as the second lambda probe 34 detects the rich mixture of engine exhaust gas and burner exhaust gas during the rich phase, the forced amplitude is adjusted to ~5% lean. After the lean exhaust gas of the exhaust gas burner 28 has been mixed with that of the internal combustion engine 10 and the gas running time, the probe detects a lean jump, and the forced amplitude is changed again. This method is repeated periodically during the entire heating phase, so that there is an alternating change between a substoichiometric combustion air ratio $\lambda_B<1$ and a superstoichiometric combustion air ratio $\lambda_B>1$. Due to the lack of oxygen storage capacity between the exhaust gas burner 28 as the actuator of this control and the second lambda probe 34, 42 as the measuring element, the lean and rich periods are very short in accordance with the gas running time and thus the frequency of the switchover is high. As a result, no long lean and rich phases are formed which could lead, for example, to increased particulate emissions from the exhaust gas burner 28.

This means that combustion air control can be implemented in a very cost-effective and simple manner in interaction with the exhaust gas burner. The combustion air ratio AB of the exhaust gas burner 28 is pilot-controlled via the blown-in secondary air and the activation period of the fuel injector 58.

Figure 2:
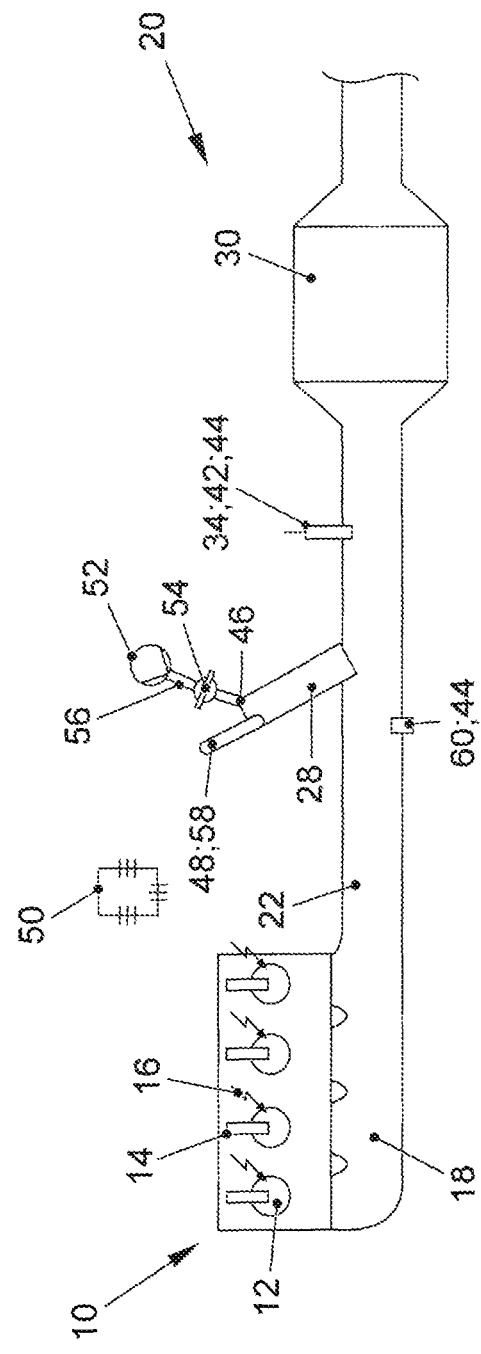
FIG. 2 shows a further exemplary embodiment of an internal combustion engine with an exhaust gas aftertreatment system for carrying out a method according to the invention for heating a catalytic converter.

FIG. 2 shows a particularly simple exemplary embodiment of an internal combustion engine 10 with an exhaust gas aftertreatment system for carrying out a method according to the invention for heating a three-way catalytic converter 30. The internal combustion engine 10 is designed as a gasoline engine. The internal combustion engine 10 can be designed as a naturally aspirated engine. An exhaust gas burner 28 is provided downstream of an outlet 18 of the internal combustion engine 10 and upstream of a three-way catalytic converter 30, and by means of this exhaust gas burner hot burner exhaust gas can be introduced into the exhaust gas duct 22 at an inlet point 32 upstream of the three-way catalytic converter 30 in order to heat up the three-way catalytic converter 30.

FIG. 4 shows a further, preferred exemplary embodiment of an internal combustion engine 10 with an exhaust system 20. With substantially the same structure as shown in FIG. 1, in this exemplary embodiment the inlet point 32 of the exhaust gas burner 28 is formed downstream of a first three-way catalytic converter 30 close to the engine and upstream of a further three-way catalytic converter 38, 40.

The further catalytic converter 38, 40 is preferably arranged in an underbody position of a motor vehicle. In order to enable the further catalytic converter 38, 40 to heat up quickly to its light-off temperature, the hot exhaust gases of the exhaust gas burner 28 are introduced into the exhaust gas duct 22 at the inlet point 32, so that the exhaust gas flow of the internal combustion engine 10 is mixed with the exhaust gases of the exhaust gas burner 28 and ensures a uniform heating of the further catalytic converter 38, 40 over the cross section of the exhaust gas duct 22.

LIST OF REFERENCE NUMERALS

10 internal combustion engine
12 combustion chamber
14 fuel injector
16 spark plug
18 outlet
20 exhaust system
22 exhaust gas duct
24 exhaust gas turbocharger
26 turbine
28 exhaust gas burner
30 three-way catalytic converter
32 inlet point
34 second lambda probe
36 third lambda probe
38 second three-way catalytic converter
40 four-way catalytic converter
42 jump probe
44 broadband probe
46 secondary air supply
48 fuel supply
50 control unit
52 secondary air pump
54 secondary air valve
56 secondary air line
58 fuel injector
60 first lambda probe

The invention claimed is:

1. A method for heating a catalytic converter in an exhaust system of an internal combustion engine with at least one combustion chamber, wherein an exhaust gas burner is arranged in the exhaust system upstream of the catalytic converter for heating the catalytic converter, wherein a first lambda probe for controlling the combustion air ratio of the internal combustion engine is arranged downstream of an outlet the internal combustion engine and upstream of the exhaust gas burner, and wherein a second lambda probe for controlling the combustion air ratio of the exhaust gas burner is arranged immediately downstream of the exhaust gas burner and upstream of the catalytic converter, said method comprising the following steps:
   operating the internal combustion engine with a stoichiometric combustion air ratio ($\lambda_E=1$),
   activating the exhaust gas burner, wherein the exhaust gas burner is operated alternately with a substoichiometric combustion air ratio ($\lambda_B<1$) and a superstoichiometric combustion air ratio ($\lambda_B>1$),
   wherein a switchover from the substoichiometric combustion air ratio ($\lambda_B<1$) to the superstoichiometric combustion air ratio ($\lambda_B>1$) takes place as soon as a rich breakthrough is detected by the second lambda probe,
   wherein a switchover from the superstoichiometric combustion air ratio ($\lambda_B<1$) to the substoichiometric combustion air ratio ($\lambda_B>1$) takes place as soon as a lean breakthrough is detected by the second lambda probe, and
   wherein a frequency of the alternating change between the substoichiometric combustion air ratio and the superstoichiometric combustion air ratio is greater than one Hertz.

2. The method for heating a catalytic converter according to claim 1, wherein a third lambda probe, by which a stoichiometric exhaust gas is set downstream of the catalytic converter, is arranged downstream of the catalytic converter.

3. The method for heating a catalytic converter according to claim 1, wherein the combustion air ratio ($\lambda_B$) of the exhaust gas burner is adjusted by an adjustment of the quantity of fuel in the exhaust gas burner.

4. The method for heating a catalytic converter according to claim 1, wherein the combustion air ratio ($\lambda_B$) of the exhaust gas burner is set by an adjustment of the quantity of air in the exhaust gas burner or by an adjustment of the quantity of fuel and the quantity of air.

5. The method for heating a catalytic converter according to claim 1, wherein the superstoichiometric combustion air ratio is set in the range $1.02<\lambda_B<1.1$.

6. The method for heating a catalytic converter according to claim 1, wherein the substoichiometric combustion air ratio is set in the range $0.9<\lambda_B<0.98$.

7. The method for heating a catalytic converter according to claim 1, wherein the method is initiated immediately after a cold start of the internal combustion engine.

8. An exhaust gas aftertreatment system for an internal combustion engine with at least one combustion chamber, wherein the exhaust gas aftertreatment system comprises:
   an exhaust system in which an exhaust gas burner for heating a catalytic converter is arranged in a flow direction of an exhaust gas in the internal combustion engine and in which the catalytic converter is arranged downstream of the exhaust gas burner,
   wherein a first lambda probe for controlling the combustion air ratio of the internal combustion engine is located downstream of an outlet of the internal combustion engine and upstream of the exhaust gas burner, and
   wherein a second lambda probe, by which a combustion air ratio ($\lambda_B$) of the exhaust gas burner can be regulated, is arranged immediately downstream of the exhaust gas burner, and
   a control unit which is set up to implement a method according to claim 1 when a machine-readable program code is executed by the control unit.

9. The exhaust gas aftertreatment system according to claim 8, wherein the catalytic converter is designed as a three-way catalytic converter or as a four-way catalytic converter.

10. The exhaust gas aftertreatment system according to claim 8, wherein the catalytic converter is arranged as a first emission-reducing exhaust gas aftertreatment component in the flow direction of an exhaust gas of the internal combustion engine through the exhaust system.

11. The exhaust gas aftertreatment system according to claim 8, wherein the catalytic converter is arranged in an underbody position of a motor vehicle.

12. The exhaust gas aftertreatment system according to claim 8, wherein the second lambda probe is designed as a jump probe.

13. The exhaust gas aftertreatment system according to claim 8, wherein the second lambda probe is designed as a broadband probe.

14. The exhaust aftertreatment system according to claim 8,
 wherein a further catalytic converter is arranged downstream of the catalytic converter,
 wherein a third lambda probe is arranged downstream of the catalytic converter and upstream of the further catalytic converter, and
 wherein the further lambda probe is set up to regulate the combustion air ratio ($\lambda_E$) of the internal combustion engine.

* * * * *